US008376404B2

(12) United States Patent
Tinnin et al.

(10) Patent No.: US 8,376,404 B2
(45) Date of Patent: Feb. 19, 2013

(54) INTEGRATED TOOTH RAKE LOCK FOR STEERING COLUMN

(75) Inventors: Melvin Lee Tinnin, Clio, MI (US); Kevin M Burns, Flushing, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 275 days.

(21) Appl. No.: 12/952,917

(22) Filed: Nov. 23, 2010

(65) Prior Publication Data

US 2012/0126521 A1 May 24, 2012

(51) Int. Cl.
*B62D 1/18* (2006.01)
*B62D 1/184* (2006.01)
*B62D 1/187* (2006.01)

(52) U.S. Cl. .......................... 280/777; 280/775; 74/493
(58) Field of Classification Search ................... 280/775, 280/777, 779; 74/492, 493
See application file for complete search history.

(56) References Cited

U.S. PATENT DOCUMENTS

| | | | | |
|---|---|---|---|---|
| 2,929,262 A * | 3/1960 | Felts | | 74/493 |
| 2,929,263 A * | 3/1960 | Felts | | 74/493 |
| 5,143,402 A * | 9/1992 | Higashino et al. | | 280/775 |
| 5,144,855 A * | 9/1992 | Yamaguchi et al. | | 74/493 |
| 5,409,261 A * | 4/1995 | Yamaguchi | | 280/775 |
| 5,452,624 A * | 9/1995 | Thomas et al. | | 74/493 |
| 5,566,585 A * | 10/1996 | Snell et al. | | 74/493 |
| 5,871,233 A * | 2/1999 | Tanaka et al. | | 280/777 |
| 6,139,057 A * | 10/2000 | Olgren et al. | | 280/775 |
| 6,186,547 B1 * | 2/2001 | Skabrond et al. | | 280/775 |
| 6,272,945 B1 * | 8/2001 | Jolley | | 74/493 |
| 6,279,414 B1 * | 8/2001 | Moon | | 74/493 |
| 6,419,269 B1 * | 7/2002 | Manwaring et al. | | 280/775 |
| 6,460,427 B1 * | 10/2002 | Hedderly | | 74/493 |
| 6,616,185 B2 * | 9/2003 | Manwaring et al. | | 280/775 |
| 6,659,504 B2 * | 12/2003 | Riefe et al. | | 280/777 |
| 6,761,376 B2 * | 7/2004 | Riefe et al. | | 280/777 |
| 6,799,486 B2 * | 10/2004 | Manwaring et al. | | 74/493 |
| 7,083,198 B2 * | 8/2006 | Lee | | 280/775 |
| 7,861,615 B2 * | 1/2011 | Harris et al. | | 74/493 |
| 8,006,587 B2 * | 8/2011 | Schnitzer et al. | | 74/493 |
| 2002/0171235 A1 * | 11/2002 | Riefe et al. | | 280/775 |
| 2003/0193180 A1 * | 10/2003 | Riefe et al. | | 280/777 |
| 2004/0251672 A1 * | 12/2004 | Lee | | 280/775 |
| 2008/0217900 A1 * | 9/2008 | Ozsoylu et al. | | 280/775 |
| 2009/0272219 A1 * | 11/2009 | Okada et al. | | 74/493 |
| 2010/0300237 A1 * | 12/2010 | Ridgway et al. | | 74/493 |
| 2011/0041642 A1 * | 2/2011 | Havlicek | | 74/493 |

* cited by examiner

*Primary Examiner* — Drew Brown
*Assistant Examiner* — Barry Gooden, Jr.
(74) *Attorney, Agent, or Firm* — Cantor Colburn LLP

(57) ABSTRACT

A steering column assembly includes a rake bracket, a steering column pivotably attached to the rake bracket and a rake lock mechanism. The rake lock mechanism includes a plurality of rake teeth located at the rake bracket and a plurality of jacket teeth engageable with the plurality of rake teeth and located at the steering column at a teeth distance from the plurality of rake teeth. A retainer is insertable through the rake bracket and into the steering column to maintain the teeth distance. When a predetermined force is applied to the steering column, a portion of the retainer is detached to allow the plurality of jacket teeth to approach the plurality of rake teeth and engage therewith.

23 Claims, 4 Drawing Sheets

INTEGRATED TOOTH RAKE LOCK FOR STEERING COLUMN

FIELD OF THE INVENTION

The subject matter disclosed herein relates to steering columns for motor vehicles. More specifically, the subject disclosure relates to a lock mechanism for a rake adjustment of a steering column.

Steering columns for motor vehicles are often provided with mechanisms for adjusting the steering column's position by an operator of the motor vehicle. Available adjustments typically include a telescoping adjustment in which the steering column is extended toward the operator or compacted away from the operator, and a tilt or rake adjustment in which an angular position of the steering column is changed relative to the operator. Rake is adjusted by releasing an adjustment lever from a secured position, which then allows for rotation of the steering column about a pivot, typically located at a end of the steering column opposite that of the steering wheel. Returning the adjustment lever to the secured position retains the steering column in a desired set position about the pivot In a vehicle impact situation, the steering column is configured to absorb energy of the impact to prevent or reduce injury to the operator due to impact with the steering wheel. In doing so, it is desired to further lock the rake position of the steering column to allow controlled energy absorption in such situations. Typically, such a secondary lock mechanism is provided comprised of teeth disposed at a rake bolt connected to the adjustment lever. These teeth engage corresponding teeth at the steering column during an impact situation via an overturning moment of the steering column about the pivot. Such typical secondary lock systems, however, tend to increase adjustment lever efforts felt by the driver when releasing and/or securing the adjustment lever. Further, such secondary locks are typically unintentionally loaded on only one tooth of the teeth located at the rake bolt as a result of the tooth being an independent component that succumbs to offset loading not perpendicular to the tooth array. Distribution of loading across more than tooth would be beneficial to securing the steering column position in the event of impact.

SUMMARY OF THE INVENTION

According to one aspect of the invention, a steering column assembly includes a rake bracket, a steering column pivotably attached to the rake bracket and a rake lock mechanism. The rake lock mechanism includes a plurality of rake teeth located at the rake bracket and a plurality of jacket teeth engageable with the plurality of rake teeth and located at the steering column at a teeth distance from the plurality of rake teeth. A retainer is insertable through the rake bracket and into the steering column to maintain the teeth distance. When a predetermined force is applied to the steering column, a portion of the retainer is detached to allow the plurality of jacket teeth to approach the plurality of rake teeth and engage therewith.

According to another aspect of the invention, a rake lock mechanism for a steering column assembly includes a plurality of rake teeth located at a rake bracket of the steering column assembly. A plurality of jacket teeth are engageable with the plurality of rake teeth and are located at a steering column of the steering column assembly at a teeth distance from the plurality of rake teeth. A retainer is insertable through the rake bracket and into the steering column to maintain the teeth distance. When a predetermined force is applied to the steering column, a portion of the retainer is detached to allow the plurality of jacket teeth to approach the plurality of rake teeth and engage therewith.

According to yet another aspect of the invention, a method of locking a rake of a steering column assembly includes applying a predetermined force to a steering column of the steering column assembly and detaching a portion of a retainer extending through a rake bracket of the steering column assembly and into the steering column via the applied force. The steering column is moved relative to the rake bracket substantially along an axis of the steering column assembly, thereby engaging a plurality of jacket teeth disposed at the steering column with a plurality of rake teeth disposed at the rake bracket.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
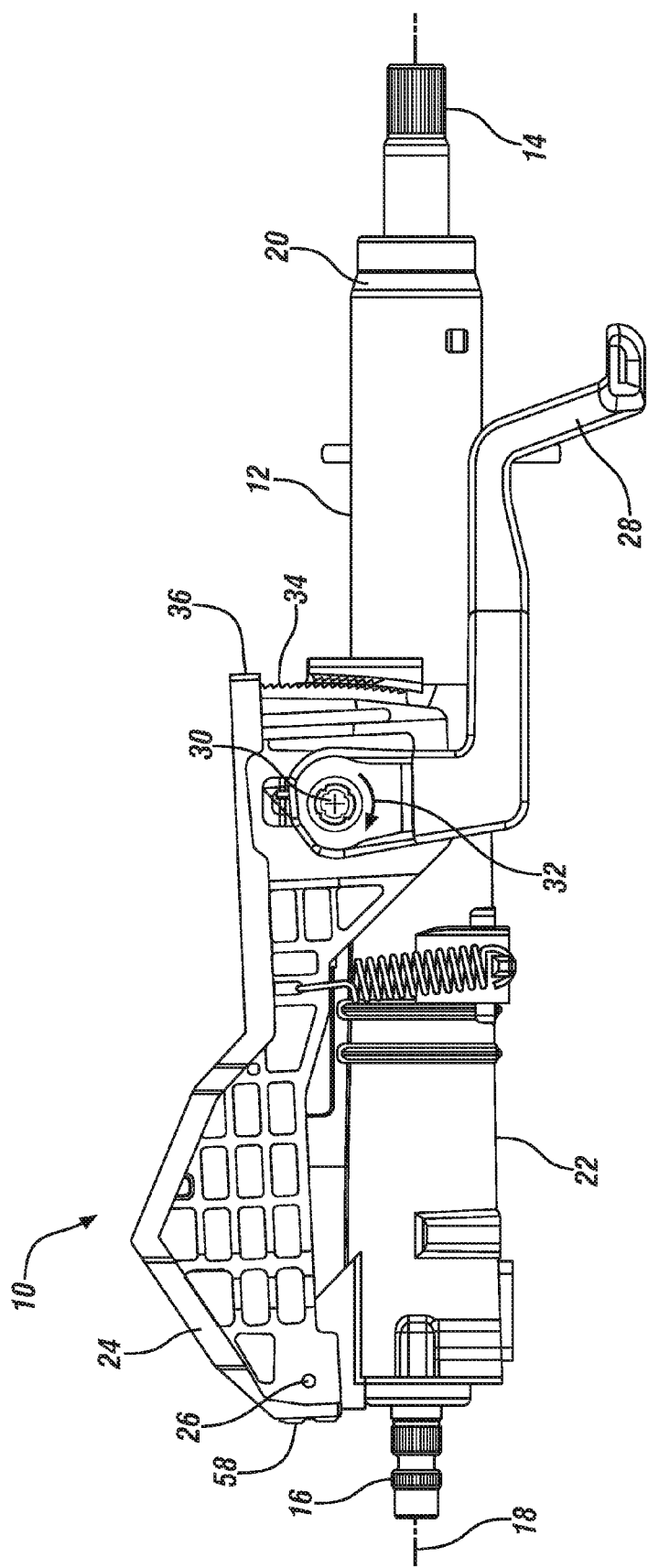
FIG. 1 is an embodiment of a steering column assembly.

Shown in FIG. 1 is an embodiment of a steering column assembly 10 for a motor vehicle, including at least rake adjustment. The steering column assembly 10 includes a column 12 having a first end 14 to which a steering wheel (not shown), or other operator control, is connectable, and a second end 16 which is operably connected to a steering system (not shown) that translates rotational motion of the column 12 about a column axis 18 into steering motion of the motor vehicle. In some embodiments, the column 12 includes an upper jacket 20 extending from the first end 14. The upper jacket 20 is at least partially located in a lower jacket 22 which extends from the second end 16 toward the first end 14. Motion of the upper jacket 20 in the lower jacket 22 along the column axis 18 is a telescopic adjustment of the steering column assembly 10. It is to be appreciated that while in the embodiment of FIG. 1, the upper jacket 20 is at least partially located in the lower jacket 22, in some embodiments, the configuration is substantially reversed, with the lower jacket 22 at least partially located inside the upper jacket 20. The lower jacket 22 is secured to a rake bracket 24 at a pivot 26.

To adjust a rake position of the column 12, an adjustment lever 28 is provided. The adjustment lever 28 is connected to a rake bolt 30 which includes one of more cam members (not shown). When the adjustment lever 28 is rotated to a secured position, as in FIG. 1, the rake bolt 30 is rotated such that the cam members frictionally engage portions of the column 12 to hold a rake position of the column 12. When the adjustment lever 28 is rotated to a released position in the direction of arrow 32 in FIG. 1, the rake bolt 30 rotates such that the frictional engagement of the cam members to the column 12 is released, thereby allowing a change in rake position of the column 12.

Figure 2:
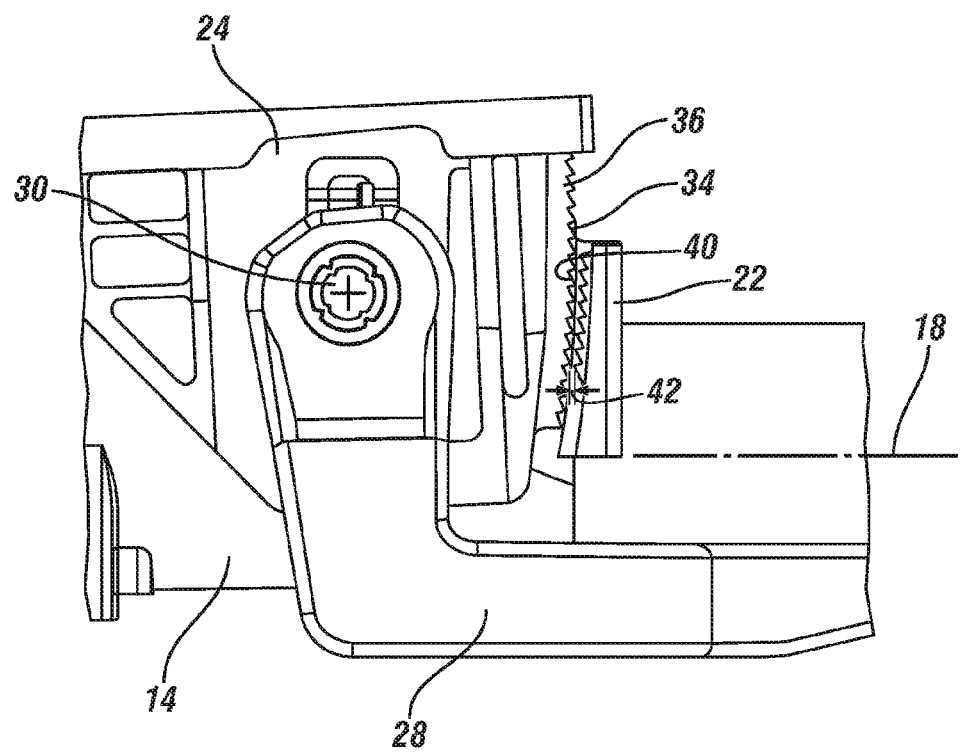
FIG. 2 is an embodiment of a rake lock mechanism of a steering assembly.

As stated above, in a vehicle impact situation it is desired to further lock the rake position of the column 12 to enhance energy absorption of the column 12 and prevent or reduce injury to the operator. To that end, and referring to FIG. 2, the rake bracket 24 is provided with a plurality of rake teeth 34 at an upper end 36 of the rake bracket 24, opposite to a lower end 38 of the rake bracket 24 at which the pivot 26 is located. The lower jacket 22 includes a plurality of complimentary jacket teeth 40 separated from the rake teeth 34 by a teeth distance 42 along the column axis 18. In some embodiments, the jacket teeth 40 are formed integral to the lower jacket 22 and the rake teeth 34 are formed integral to the rake bracket 24. The integral forming may be achieved by, for example, casting or machining. In other embodiments, the rake teeth 34 and/or the jacket teeth 40 may be formed as separate components and secured to the rake bracket 24 and the lower jacket 22, respectively, by any suitable method.

Figure 3:
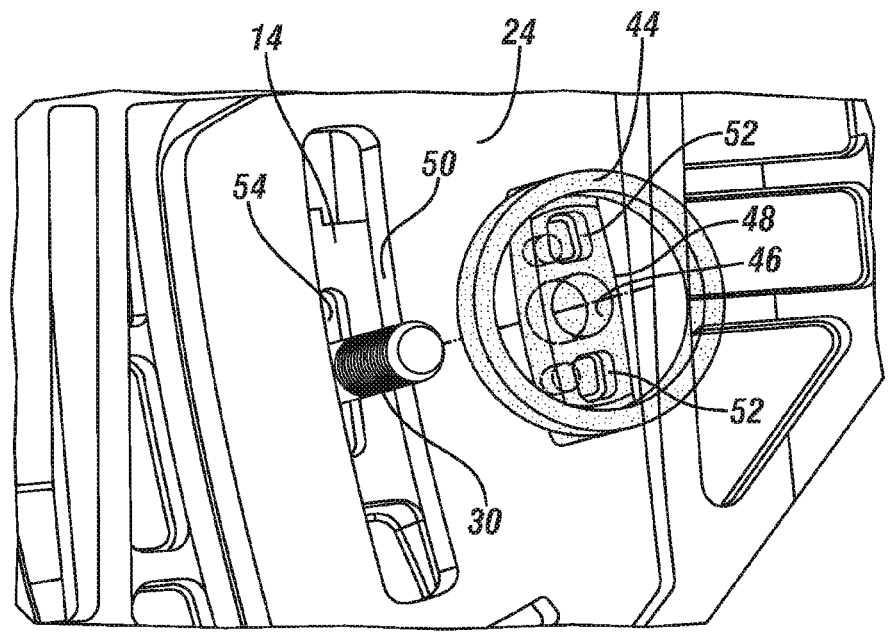
FIG. 3 is an embodiment of a retainer of a rake lock mechanism for a steering column assembly.
Figure 4:
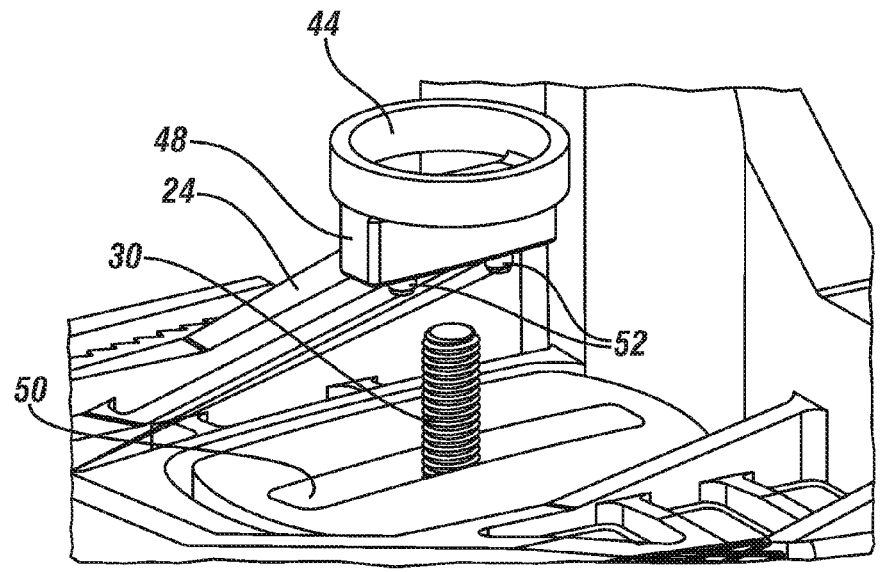
FIG. 4 is another view of a retainer of a rake lock mechanism for a steering column assembly.

Referring to FIG. 3, the teeth distance 42 is maintained during normal operation by a retainer 44 disposed at the rake bolt 30. The retainer 44 includes a bolt opening 46 to allow for the retainer 44 to be installed over the rake bolt 30. The retainer 44 includes a retainer body 48 insertable into a retainer opening 50 in the rake bracket 24 and at least one retainer pin 52 extending from the retainer body 48 which is insertable into a pin opening 54 in the lower jacket 22. In some embodiments, as shown in FIG. 4, the retainer includes two retainer pins 52, but it is to be appreciated that other numbers of retainer pins 52 may be utilized. Further, as shown, the retainer pins 52 may be substantially cylindrical in shape, but other cross-sectional retainer pin 52 shapes, for example, oval or triangular are contemplated within the present scope. Referring again to FIG. 3, the retainer opening 50, pin opening 54, retainer body 48 and at least one retainer pin 52 are all configured such that when the retainer 44 is installed onto the rake bolt 30, the retainer body 48 has a tight or interference fit to the retainer opening 50 and the at least one retainer pin 52 has a tight or interference fit to the pin opening 54 to maintain a relative position between the rake bracket 24 and the lower jacket 22 to maintain the desired teeth distance 42.

Figure 5:
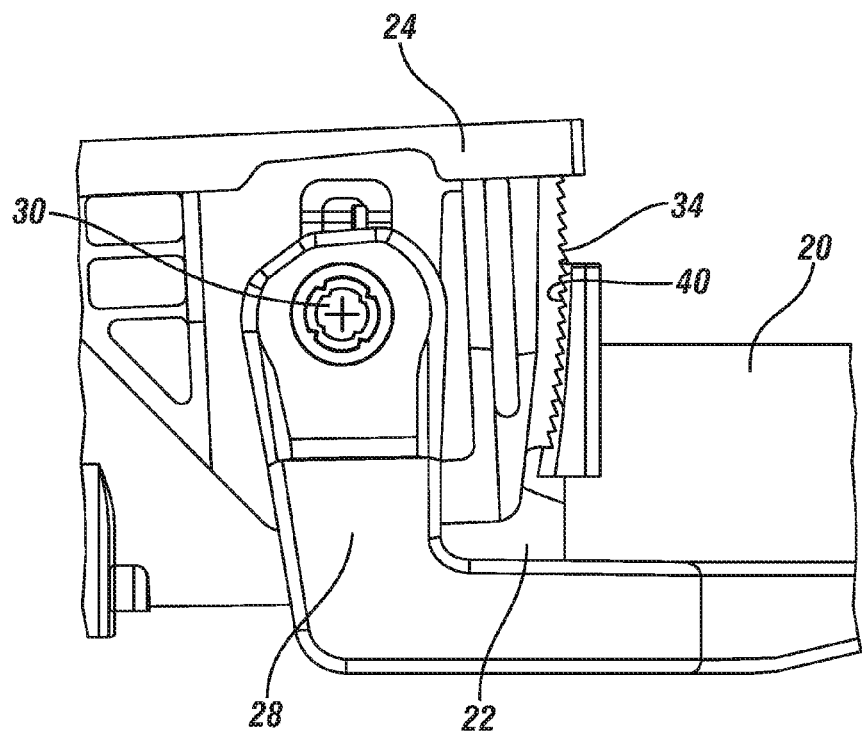
FIG. 5 is a view of a rake lock mechanism for a steering column assembly in an engaged position.

In a crash situation, when the operator impacts the steering column 12 with a predetermined force, the force is transferred along the column axis 18 into the lower jacket 22 causing the retainer pins 52 to shear off the retainer 44, thus allowing the lower jacket 22 to move along the column axis 18 relative to the rake bracket 24 and reduces the teeth distance 42 to zero, and as shown in FIG. 5, thus engaging the rake teeth 34 to the jacket teeth 40. With the jacket teeth 40 engaged with the rake teeth 34, the rake position of the steering column 12 is locked.

Figure 6:
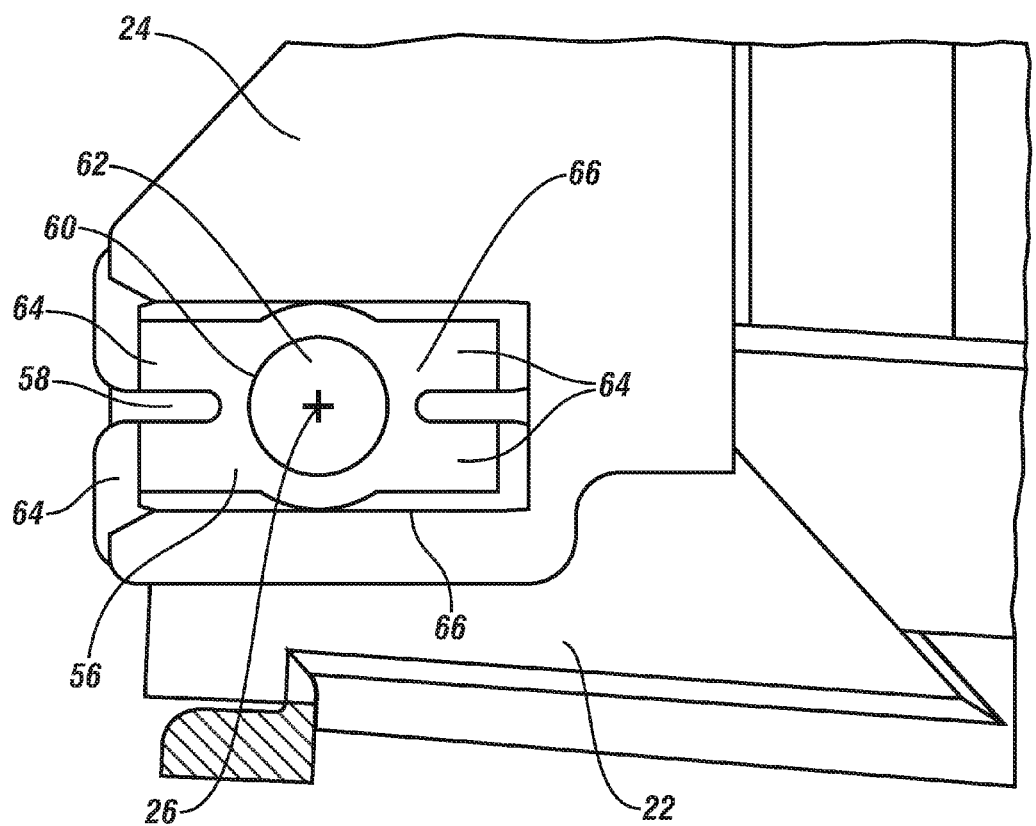
FIG. 6 is an embodiment of a pivot bushing for a steering column assembly.

Referring now to FIG. 6, some embodiments include a bushing 56 at the pivot 26. The bushing 56 fits into a bushing opening 58 in the rake bracket 24 and includes a post opening 60 into which a post 62 of the lower jacket 22 is installed with an interference fit. The bushing 56 includes one or more bushing legs 64 which abut a wall 66 of the bushing opening 58. When the jacket teeth 40 engage the rake teeth 34, an overturning moment 68 which would tend to cause disengagement of the jacket teeth 40 from the rake teeth 34 is reacted by the bushing 56/post 62 structure to prevent the jacket teeth 40 and rake teeth 34 from disengaging.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed:

1. A steering column assembly comprising:
   a rake bracket;
   a steering column pivotably attached to the rake bracket; and
   a rake lock mechanism including:
      a plurality of rake teeth disposed at the rake bracket;
      a plurality of jacket teeth engageable with the plurality of rake teeth and disposed at the steering column at a teeth distance from the plurality of rake teeth; and
      a retainer insertable through the rake bracket and into the steering column to maintain the teeth distance;
      wherein when a predetermined force is applied to the steering column, a portion of the retainer is detached to allow the plurality of jacket teeth to approach the plurality of rake teeth and engage therewith.

2. The steering column of claim 1, wherein the retainer is disposed at a rake bolt of the steering column assembly.

3. The steering column of claim 2, wherein the rake bolt is operably connected to a rake adjustment lever.

4. The steering column of claim 1, wherein the retainer includes one or more retainer pins insertable into the steering column.

5. The steering column of claim 4, wherein the one or more retainer pins are detached when a predetermined force is applied to the steering column.

6. The steering column of claim 1, wherein the teeth distance extends substantially along a central axis of the steering column.

7. The steering column of claim 1, wherein the predetermined force is applied to the steering column along a central axis of the steering column.

8. The steering column assembly of claim 1, wherein the steering column comprises an upper jacket at least partially disposed in a lower jacket.

9. The steering column assembly of claim 8, wherein the jacket teeth are disposed at the lower jacket.

10. The steering column assembly of claim 9, wherein the jacket teeth are formed integral to the lower jacket.

11. The steering column assembly of claim 10, further comprising a bushing disposed at a pivot to react to an overturning moment.

12. A rake lock mechanism for a steering column assembly comprising:
   a plurality of rake teeth disposed at a rake bracket of the steering column assembly;
   a plurality of jacket teeth engageable with the plurality of rake teeth and disposed at a steering column of the steering column assembly at a teeth distance from the plurality of rake teeth; and
   a retainer insertable through the rake bracket and into the steering column to maintain the teeth distance;
   wherein when a predetermined force is applied to the steering column, a portion of the retainer is detached to allow the plurality of jacket teeth to approach the plurality of rake teeth and engage therewith.

13. The rake lock mechanism of claim 12, wherein the retainer is disposed at a rake bolt of the steering column assembly.

14. The rake lock mechanism of claim 12, wherein the retainer includes one or more retainer pins insertable into the steering column.

15. The rake lock mechanism of claim 14, wherein the one or more retainer pins are detached when the predetermined force is applied to the steering column.

16. The rake lock mechanism of claim 12, wherein the teeth distance extends substantially along a central axis of the steering column.

17. The rake lock mechanism of claim 12, wherein the predetermined force is applied to the steering column along a central axis of the steering column.

18. The rake lock mechanism of claim 12, wherein the jacket teeth are disposed at a lower jacket of the steering column.

19. The rake lock mechanism of claim 18, wherein the jacket teeth are formed integral to the lower jacket.

20. The rake lock mechanism of claim 12, further comprising a bushing disposed at a pivot of the steering column assembly to react to an overturning moment.

21. A method of locking a rake of a steering column assembly comprising:
    applying a predetermined force to a steering column of the steering column assembly;
    detaching a portion of a retainer extending through a rake bracket of the steering column assembly and into the steering column via the applied predetermined force;
    moving the steering column relative to the rake bracket substantially along an axis of the steering column assembly, thereby engaging a plurality of jacket teeth disposed at the steering column with a plurality of rake teeth disposed at the rake bracket.

22. The method of claim 21, wherein the predetermined force is applied to the steering column along a central axis of the steering column.

23. The method of claim 21, further comprising reacting to an overturning moment via a bushing disposed at a pivot between the rake bracket and the steering column.

* * * * *